Oct. 9, 1956   R. W. McKEE   2,766,424
METHOD AND APPARATUS FOR DETECTING FISSURES IN RAIL
Filed Nov. 15, 1951   3 Sheets-Sheet 2

INVENTOR
Richard W. McKee
BY
Atty.

INVENTOR
Richard W. McKee

2,766,424

METHOD AND APPARATUS FOR DETECTING FISSURES IN RAIL

Richard W. McKee, Chicago, Ill., assignor, by mesne assignments, to Teleweld, Inc., a corporation of Idaho Application November 15, 1951, Serial No. 256,501

12 Claims. (Cl. 324—37)

This invention relates to demagnetization of the top surface of a rail ball in a sustained magnetic field, more particularly in a sustained trailing magnetic field of the type disclosed in copending United States patent application Serial No. 628,146, filed November 13, 1945, now Patent No. 2,622,131. It involves both apparatus and method. It employs an alternating current magnet, but of comparatively high frequency. The invention also relates to the position of the pickup coil in the magnetic flux circuit, that is, the distance from the main magnet creating the trailing sustained field.

For those not acquainted with rail fissure detection, the most significant way of classifying the various methods of fissure detection for the purposes of this application is to separate those that are testing changes in a moving flux field from those that are testing changes in a fixed flux field. The Sperry and Teledetector systems are of the first type. In the Sperry system, the current in the rail between the two sets of brushes sets up a moving flux field around the rail in which rides the pickup moving with the field. The pickup moves with the flux, and so long as the field continues symmetrical, the pickup cuts no lines of force and generates no signals. Where a portion of a rail containing a fissure enters the flux circuit, the current in going around the fissure changes the flux field pattern above the rail, and since the relationship of the pickup to the rail ball remains constant, the changing flux field generates a potential in the pickup. The field moves through the pickup.

The Teledetector system is similar. In this system a flux field is projected rearwardly (and forwardly) of the magnets. The flux field includes the rail ball and as viewed from the side as the car moves along the rail, so long as the rail is perfect, the field pattern is perfect. The pickup is at a certain position in this field, and it cuts no flux because the flux of the field is moving with it. As Chester McKee has defined the trailing sustained field system, "The flux lines are a sustained standing pattern with the coil mounted within that sustained pattern and it requires a flaw of some description to change the flux pattern in order to create a signal."

In the second class are those that are testing changes in fixed flux fields. The outstanding system of this class is that of the Association of American Railroads (A. A. R.), wherein a rail is magnetized, leaving a residual field, and thereafter a pickup is moved through the residual field. In the case of a perfect rail, after the pickup has reached a constant speed, it will generate no E. M. F. Not until the density or angularity of the flux in the field varies, will the pickup generate a signal.

The preceding three paragraphs are pertinent to this application because the principal object of this invention is to eliminate signals derived from harmless surface defects in order to lighten the rail observing load for the operators, and thereby to eliminate false stops by the car during the exploratory step. This object is attained in the second method of testing by demagnetizing the surface skin of the rail ball by using an alternating current magnet. But presumably an A. C. magnet is effective for residual testing only for only in this method has it been used. Billstein, in United States Patent No. 2,218,784, shows a 60-cycle A. C. magnet positioned between the trailing magnet and the flux responsive means in a residual magnetic field system, that is, the A. A. R. system. Similarly, the A. C magnet 46 shown in Fig 1, Sheet 1, of United States Letters Patent No. 2,388,683, to Royal Frickey and Chester W. McKee, is positioned ahead of all testing equipment and is demagnetizing residual magnetism.

One does not think of adapting the A. C. magnet to a sustained flux field system of either the Sperry or Teledetector types because the mind immediately encounters a bar or block, the A. C. magnet is working against forces greater than its own. In the Sperry system, the field above the rail varies with the differences in the paths of the current through the rail ball, and while it is doubtful that an A. C. magnet would appreciably affect the path of the current in the ball immediately beneath the growler, it is reasonably certain that the current would flow through that portion of the rail adjacent to the pickup without being influenced by the A. C. magnet. The same would be true of Teledetector's trailing sustained field system excepting for a time lag for repolarization and the fact that the trailing sustained field is declining in strength as the magnet moves away. Whereas in the Sperry system, the field between the brushes is of constant strength with constant E. M. F. being applied to it so that an A. C. magnet would only affect the rail immediately adjacent its poles, in the Teledetector system the field is declining in strength and there will be a time lag in remagnetization of the top skin.

The object of this invention is to take advantage of these last-mentioned factors as they relate to the A. C. magnet functioning against a weakening, trailing sustained field immediately in front of the flux responsive means. The reason for wanting to depolarize the rail ball skin resides in the fact that in applicant's system, the magnets are no longer the small assemblies shown in United States Letters Patent No. 2,388,683 or in copending application Serial No. 749,166, for here magnet assemblies Nos. 1 and 2 weigh 2,000 pounds each, and the main magnet assembly weighs 3,500 pounds. These are the weights of the magnets for each rail. No longer is the trailing sustained field imperceptible three feet behind the main magnet, but it is pushed out thirty feet and this despite interpositioning of standard 33" magnetic car wheels. Polarization of the top rail ball skin is very strong and the burns, shelley spots, flows, and the like generate strong potential signals in the amplifier. However, after the A. C. magnet demagnetizes a burned spot or other surface defect, the only way of remagnetizing the burned spot is by the trailing sustained field. This requires time and additionally, the trailing sustained field is steadily declining in strength.

Another object of this invention is to position the pickup coil in the trailing sustained field at the optimum point where variations in that field will produce a signal of maximum strength in the pickup. Heretofore, applicant positioned the pickup in the trailing sustained field by a cut and try method but now the pickup is positioned in that field at the point where the flux is leaving the rail at substantially right angles to the surface of the ball.

Figure 1:
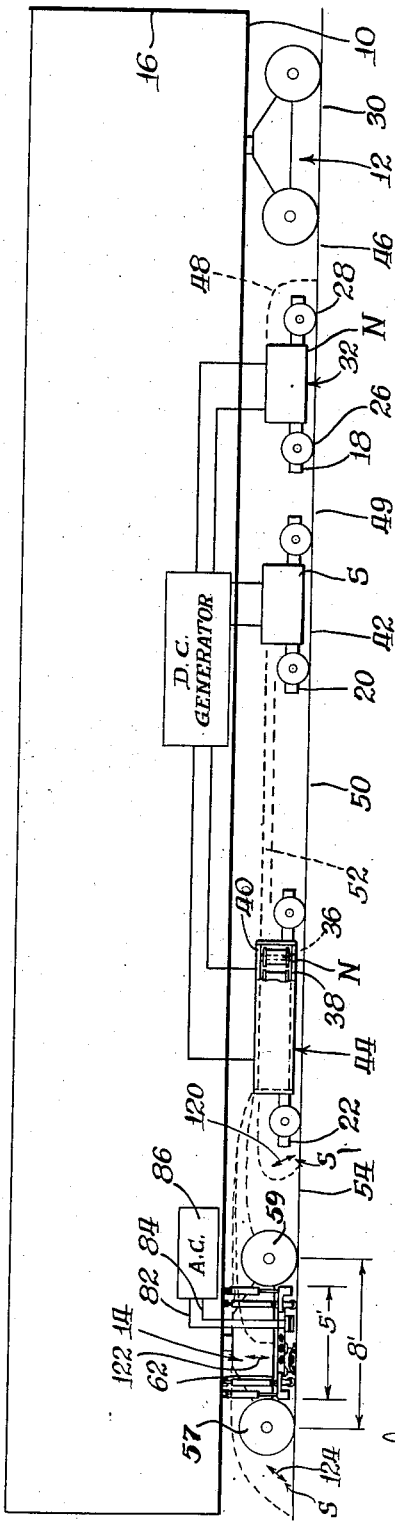
Fig. 1 is a scale schematic illustration showing the correct relative, longitudinal dimensions of the three direct current magnets, the A. C. magnet, and pickup (flux responsive means), and approximately the correct relative spacings of these five units for practicing the present invention.

Continuing to refer to the drawings, and particularly to Figure 1, the car 10 is supported on two trucks 12 and 14. The front of the car is designated by the numeral 16. Disposed between the car trucks 12 and 14 are three magnet-bearing trucks 18, 20 and 22. Each of these latter is a true truck and consists of a generally rectangular frame supported by pairs of wheels, each pair being non-rotatably mounted on a shaft, the near wheels of each truck being designated 26 and 28 and engaging the rail 30 as shown in Fig. 1.

For this invention, the relative size of the magnets, their polarity, and their spacing are important. All of the magnets are direct current magnets, are constructed of similar elements and are connected to a common D. C. generator. The size of each vertical core, the number of windings on each vertical core, and the size of the wire in the windings together with the electromotive force across the windings of each core are approximately the same in all of the magnets. The magnet 32, called the first magnet, consists of three vertical iron cores with their three top poles tied together by an iron bar and their three bottom poles tied together by an iron bar, as is suggested by the cut-away portion of the main magnet 44, wherein a vertical iron core 36 is tied to a lower iron bar 38 and a top iron bar 40.

The lower pole of the first magnet 32 is north. For a reason that is not clearly understood, where three direct current magnets of the types 32, 42 and 44 are used, the main magnet 44 should have its lower pole a north, which on the basis of rocking the molecules in the rails means that the lower pole of the first magnet must also be a north (see copending application Serial No. 749,166). The car has been tested by reversing the polarity of all three magnets so that the trailing sustained field is set up by a south pole on the main magnet, but for a reason not clear to applicant, they do not obtain from this trailing sustained field results as good as those from a field created by magnets of north, south and north polarities respectively. The second magnet 42 is identical with the first magnet 32, excepting that the windings and hence the polarity is reversed. The magnets shown in Fig. 1 are in no way related to the magnets on the far rail. There are two independent magnets mounted on each truck. The magnets on one rail are wired through switches so that all three may be simultaneously energized.

The main magnet 44 has six vertical cores and its cores and windings are similar to the cores and windings of the first and second magnets. In theory, the main magnet is twice as powerful as the first or the second magnets.

The first and second magnets are spaced by a distance of seven feet which will be considered as X, while the second and main magnets are spaced by the distance 2X, or approximately fourteen feet. The theory of this arrangement of the direct current magnets is this. Ignoring for the moment the effect upon the molecules in the rail, a portion of the flux circuit of the leading portion of the first magnet 32 will establish a leading sustained field through the rail at 46 and the air at 48 and thence back to the upper pole of the same magnet. More than half of the flux from the first magnet, however, will move down the rail at 49 to the lower pole of the second magnet 42, which is a south pole. A third flux circuit will be established between the trailing pole portion of the second magnet 42 through the rail portion 50 to the leading north pole portion of the main magnet 44. Substantial quantities of flux will move along the paths 50 and 52. Most of the flux from the main magnet will form a circuit rearwardly through the rail 54 and this flux will be pushed well back into the rail. This main magnet forms the moving flux circuit which includes the magnet, the rail and the air above the rail, and it is that portion of the flux circuit in the air which is tested.

Continuing to refer to Fig. 1, between the wheels 57 and 59 of truck 14 of the car 10, there is suspended over each rail from the car 10 a carriage 62, called the detector carriage. These carriages are not trucks and are not attached to truck 14, but function independently of each other and the car truck. They are raised and lowered by air cylinders 64 and pistons 66 on telescoping guides 68 and 70.

Figure 2:
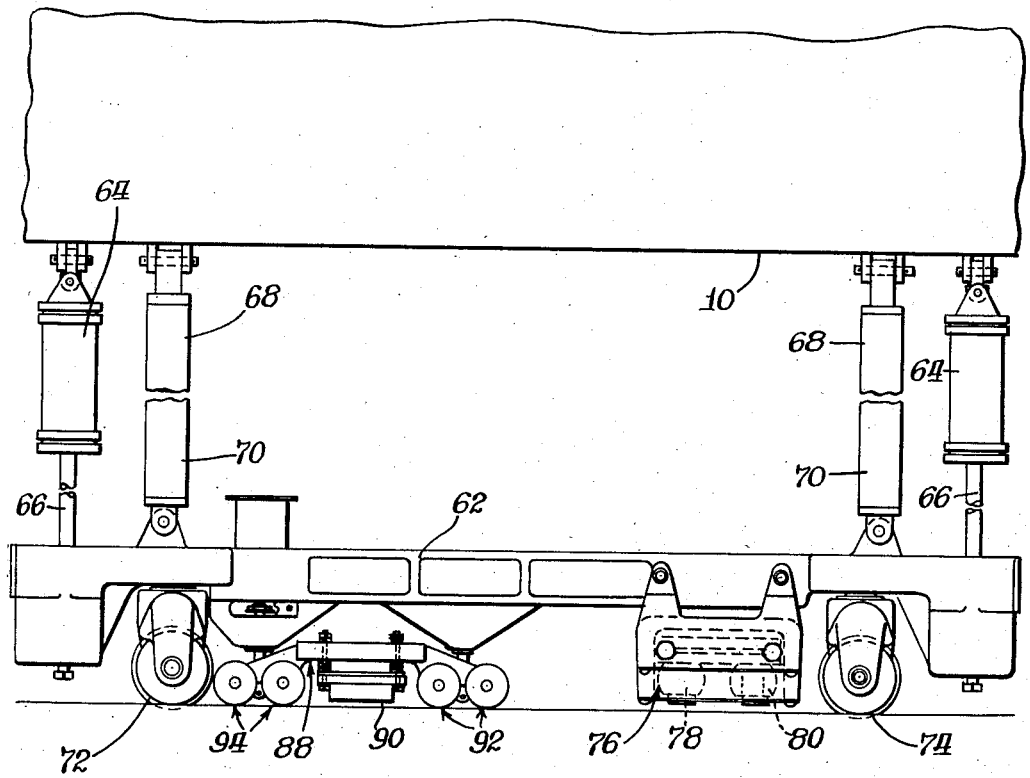
Fig. 2 is a side elevation of the detector carriage and the A. C. magnet showing more exactly its relation to the pickup coil.
Figure 3:
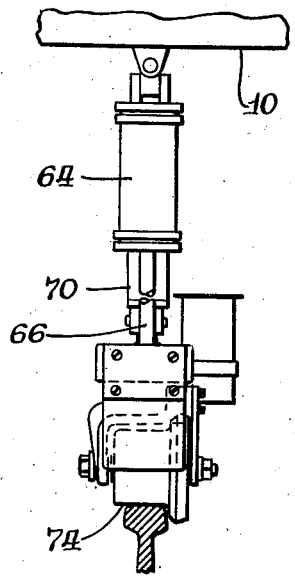
Fig. 3 is an end view of the carriage.

In its lowermost position, a detector carriage 62 rides freely on two flanged wheels 72 and 74 whose flanges are pressed against the gauge side of the rail by the telescoping guides 68 and 70. Rigidly fastened by any suitable means to the detector carriage 62 immediately behind the wheel 74 is an alternating current magnet 76 consisting of two vertically positioned flux conductive cores 78 and 80, see Fig. 2, whose magnetically reinforcing conductive windings are connected to each other in series, and by conductors 82 and 84 to an alternating current generator 86. The frequency of this generator is 900 cycles per second. Its poles are spaced from the rail by about one-fourth inch and it operates on a voltage of 200 to 250 depending upon the size of the rail. The distance from the trailing pole of the main magnet 44 to the alternating current magnet 76 is approximately ten feet or 1½ X.

Independently suspended from the detector carriage 62 is the pickup carriage 88 which carries the pickup coil 90 and which rides along the rail on sets of wheels 92 and 94. The distance from the pickup coil to the trailing edge of the alternating current magnet 76 is approximately eighteen inches or ¼ X.

This application is not concerned with the details of construction of any of the magnets or their trucks or of the detector carriage or pickup carriage or its method of suspension. Consequently, these construction details are shown somewhat schematically in the drawings and are not described. The correct relative longitudinal dimensions of the magnets, pickup coil and alternating current magnet are shown in Fig. 1 and the spacing shown is important within a limited range. The pickup carriage is longitudinally fixed (substantially, there being a little lengthwise play) with respect to the car, and the trailing main truck 14. The axles on this truck are on eight foot centers. The car itself is 72 feet long. The main magnet truck is on wheel shafts on nine and a half foot centers and the first and second magnets are on trucks on which the shafts are spaced by six and one-quarter feet. The wheels 57 and 59 of the truck 14 are standard 33" car wheels and are magnetic.

Applicant's problem was to provide the desired spacing of X and 2X between the three magnets and then to position the pickup coil reasonably close to the trailing magnet. The electromotive force generated by these magnets is so great that the field extends well behind the car, thirty feet behind the main magnet 44. Dip needle tests were made on the trailing sustained field at the Union Pacific test track at Valley, Nebraska, and it was found that the flux is leaving the rail at substantially right angles between the wheels of the trailing car truck. These car truck wheels are magnetic and the leading wheel shunts a portion of the flux through itself and thereby shortens the trailing sustained field.

This application is the first to disclose that the pickup coil should be positioned in the flux circuit as close to the point where the angle of emersion of the flux leaving the rail ball is at right angles to the ball surface as possible. Heretofore, applicant has positioned the pickup coil in the trailing sustained field by a cut and try method, and this method has been useful in getting the pickup coil near the best point, which is where the flux is leaving the rail ball at right angles to its surface. In copending application Serial No. 749,166, the flux is shown leaving the rail at an obtuse angle (with respect to the magnet 18). Applicant does not now believe that this application shows a true picture of the field, nor does he wholly agree with the statements made at that time found on page 5 of that application. In 1947, the pickup coil was not being positioned in the moxing flux field by means of a dip needle. This instrument has been used only recently. The action of the dip needle as it moves away from an upright pole piece having a north pole adjacent to the rail is this: Initially, the south pole of the dip needle points at an angle at the bottom of the pole with the dip needle's north pole extending angularly outwardly as indicated by the arrow 120 in Fig. 1. As the dip needles moves away from the pole, it assumes a more and more erect position until it is vertical, as at 122. Thereafter the south pole is farther away from the magnet, as at 124, and ultimately the dip needle assumes a horizontal position with its north pole pointed toward the magnet. Actually, before this occurs, the dip needle comes under the influence of and its position is controlled by the earth's magnetic field. The flux leaving the ball vertically is in flux circuits that are deep in the rail ball, i. e., 108 in Fig. 6, and hence from flux circuits that are affected by internal fissures.

The frequency of the alternating current magnet is 900 cycles per second. It is reasonably clear that an effective frequency is determined by several factors, i. e., the speed of the car along the rail, the strength of the trailing sustained field at the point behind the main magnet at which the alternating current magnet is located, the electromotive force of the alternating current magnet itself, and undoubtedly the size of the cross sectional area of the rail ball. Applicant has experimented in three ways after first spacing the pickup coil from the main magnet so as to give optimum results on the recording tape in the cab. Firstly, the frequency of the alternating current magnet has been widely varied. Operating on standard 60 cycles with the car moving at eight miles an hour, no appreciable effect on the strength of potential signals generated by surface defects such as burns was perceived. Increasing the frequency to 800 cycles per second appreciably reduced misleading signals from surface defects. His tests further showed that a frequency in excess of 1100 cycles per second did not result in a sufficient improvement to warrant demagnetizing. Operating the car at eight miles an hour, he concluded that in a range of 750 cycles to 1050 cycles, an alternating current demagnetizer was worthwhile. In tests at Valley, Nebraska, the car with the magnets arranged as shown in Fig. 1, ran the track with the demagnetizer unenergized, and then immediately re-ran the track with the demagnetizer energized. The best result was obtained from a frequency of 900 cycles and several test runs on the same track wherein the characteristics and positions of fissures and surface defects are exactly known resulted in a showing of a 62 percent reduction in visual indication markings derived from surface defects.

Testing also considered the effect of the spacing of the pickup 90 behind the alternating current magnet 76. This spacing must be sufficient when considered with the electromotive force in the alternating current magnet so that the alternating magnetic field itself will not affect the pickup. On the other hand, this being a trailing sustained field, the pickup must be sufficiently close so that the flux flowing deep in the rail will not have the time to repolarize the surface defects. The trailing sustained field is a weakening one and this taken in conjunction with the normal lag in time for flux to effect polarization of molecules accounts in part for the success of the system. The accompanying chart illustrates generally the results of tests made at Valley, Nebraska, with four different frequencies with the current running at eight miles an hour. The best results were obtained with the A. C. magnet operating on a frequency of 900 cycles, the tape showing 62% less indications from surface defects than were shown by the same apparatus run over the same piece of track with the A. C. magnet unenergized.

| Speed of car along the rail | Duration of North Polarization | Duration of South Polarization | Duration of Sustained North Re-Polarization | No. of Polarity Changes by A. C. Magnet [1] | Magnetic Rebuild between A. C. Magnet and pickup | Percentage of Surface Defects Suppressed |
|---|---|---|---|---|---|---|
| 8 miles per hour, 1 1/2 per second | 1/2 second | 1 second | 3 seconds (approximately) | 32 at 800 cycles<br>37 at 900 cycles<br>41 at 1,000 cycles<br>47 at 1,100 cycles | 1/8 sec<br>1/8 sec<br>1/8 sec<br>1/8 sec | Appreciable.<br>62%.<br>Appreciable.<br>Little or no Suppression. |

[1] The A. C. demagnetization occurs about one second after the beginning of the sustained North repolarization.

Accelerating the speed of the car will reduce the duration of the three polarizations. At the same frequencies shown in the chart, the changes in polarizations of the rail ball will be correspondingly increased, which means that the optimum frequency will be lower than 900 cycles found desirable at eight miles an hour. Conversely, if the speed of the car is decreased, the optimum frequency for the alternating current should be higher.

Figure 4:
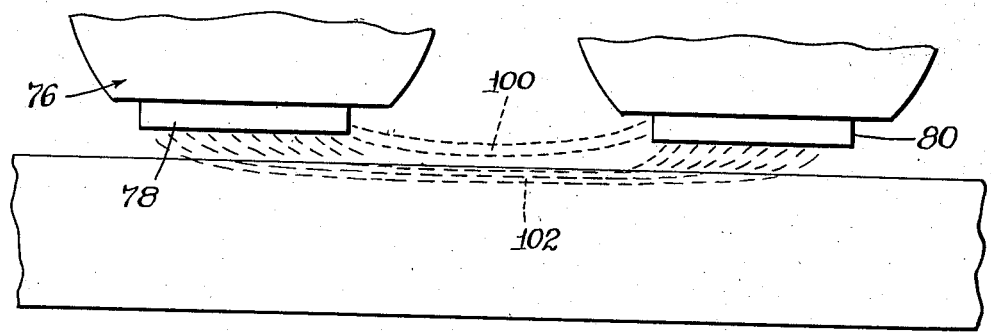
Fig. 4 is a theoretical illustration of the depth of penetration of the lines of flux of a 900 cycle A. C. magnet traversing a rail ball at eight miles an hour.

Some theoretical explanation for the operation of the system may be helpful. In Fig. 4, there is schematically illustrated the two poles 78 and 80 of the alternating current magnet 76 adjacent a rail ball with flux 100 in the air and flux 102 in the upper skin of the ball. The comparatively slight penetration of the flux from the alternating current magnet 76 circuit into the ball surface is due in part to the electromotive force in the magnet, in part to the spacing of the poles above the rail, in part to its speed of movement along the rail, but primarily to the number of changes in polarity which occur per second. In other words, the reason that applicant obtains unsatisfactory results for frequencies above 1100 is that the time in which the flux flows in a single direction is too short to substantially penetrate the ball skin. When the frequency is dropped below 750 cycles, it is believed that here the alternating flux circuit is able to penetrate the rail ball more deeply and this further weakens the trailing sustained field.

Figure 5:
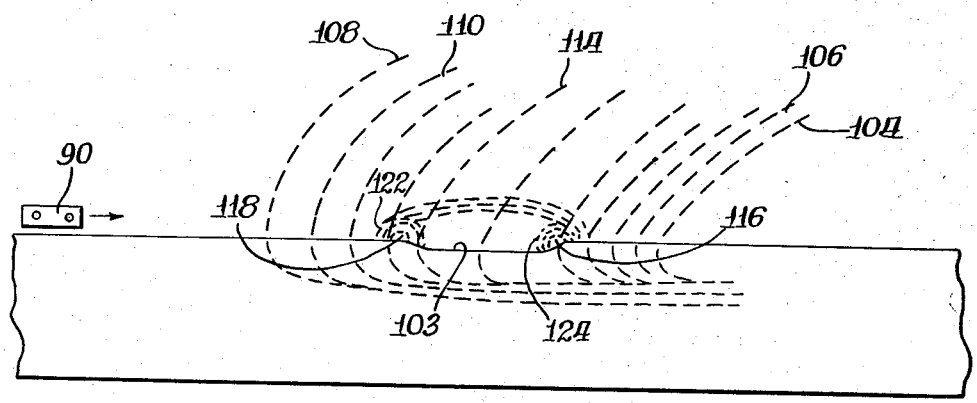
Fig. 5 is a theoretical illustration of the lines of flux in a trailing sustained field above a burn in a rail where there has been no A. C. demagnetization; and, Fig. 6 is like Fig. 5 excepting that it assumes that there has been an alternating current demagnetization immediately in advance of the pickup.

Referring now to Fig. 5, the rail ball 102 has in it a burn 103. Where there has been no alternating current demagnetization, the lines of force leaving the rail become steadily fewer as illustrated by the spacing between lines 104 and 106 as compared with the spacing between 108 and 110. At the burn, the air gap is substantially greater and consequently the number of lines of force should be reduced as are indicated by the lines 112 and 114. It is thought that the forward edge 116 and the rear edge 118 of the burn develop in the sustained field individual polarities and possibly with adjacent walls having opposite polarities. Thus 116 may be a north and 118 may be a south with lines of force such as 120 extending between them and little spheres of flux at 122 and 124. Applicant's pickup 90 is a small coil on a vertical axis having a nonmagnetic core and extending lengthwise of the rail by ¾ inch over-all. In passing through the fields 120, 122 and 124, it would generate a signal comparable to that generated by small fissures.

Figure 6:
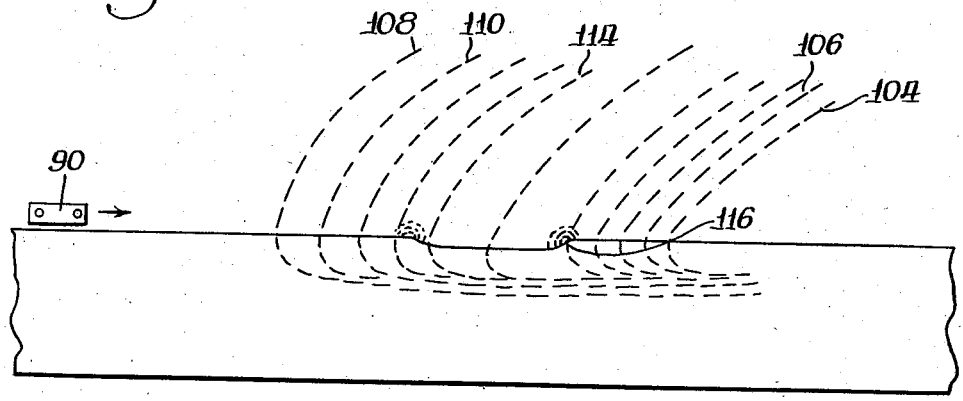

Referring now to Fig. 6, applicant shows the same field after demagnetization. Here the molecules in the skin of the rail are arranged heterogeneously and the small poles 116 and 118 will be recreated by the sustained field if sufficient time is permitted to elapse. Hence the pickup coil is mounted as close to the alternating current magnet 76 as is consistent with staying out of any appreciable field of that magnet.

Having thus described my invention, I claim:

1. The method of detecting internal fissures in a magnetizable body which comprises the steps of moving a magnet having one pole close to and the other pole substantially spaced from the body so as to create a flux circuit through the body with lines of force leaving the body at angles declining from acute to right, and of checking the density and the direction of the flux circuit adjacent the body at that point in the advancing flux circuit where the flux is leaving the body at approximately right angles to the surface of the body.

2. In that method of detecting internal defects in a magnetizable body wherein a flux responsive means is passed through a flux field adjacent the body and sustained by an electric circuit generated by a means moving ahead of and with the flux responsive means, the step of moving a high frequency, alternating magnet along the body at a point in advance of the flux responsive means sufficiently close thereto so that the time interval required by the flux responsive means to reach said point is insufficient for the electric circuit to repolarize the molecules in said skin.

3. In that method of detecting internal defects in a magnetizable body wherein a flux responsive means is passed through a trailing sustained flux field adjacent the body and generated by a preceding electromagnet moving with and at the same speed of the flux responsive means, the step of applying to the skin of the body an alternating flux of high enough frequency to prevent the flux from appreciably penetrating the rail at a point in advance of the flux responsive means sufficiently close thereto so that the time interval required by the flux responsive means to reach said point is insufficient for the trailing sustained field to repolarize the molecules in said skin.

4. The method of detecting internal fissures in the ball of a rail which comprises the steps of moving magnetic poles of opposite polarity adjacent the rail ball at a selected speed so as to slowly oscillate the poles of the molecules in the rail, of then moving a magnetic pole of one polarity adjacent the rail ball so as to impress a directional set and polarize the molecules in the rail to create a trailing sustained field, of thereafter moving a high frequency, alternating magnetic current adjacent the surface of the rail so as to depolarize the skin of the rail ball within the trailing sustained field, and of passing a flux responsive means through the flux field adjacent said skin before the directional magnetization of the molecules deep in the rail within the trailing sustained field can re-establish in the skin a polarization which will reflect obnormal conditions in the skin.

5. The method of detecting internal fissures in a rail ball which comprises the steps of subjecting the ball to a directional flow of flux for $x$ units of time, of immediately thereafter subjecting the ball to a reverse polarity for approximately $2x$ units of time, of subjecting the ball to the original polarity, and while sustaining this polarity subjecting the ball to from 25 to 50 reversals of polarity in less than $1x$ unit of time, and of moving immediately thereafter a flux responsive means through the field adjacent the rail ball.

6. The method of detecting internal fissures in a magnetizable object which comprises the steps of polarizing a rail ball in one direction for approximately one-half second, of then polarizing the rail ball in the opposite direction for one and a half seconds, of then polarizing the ball in the opposite or original direction for two seconds, of concurrently reversely polarizing the ball skin for 25 to 50 times in less than one second, and of immediately thereafter moving a flux responsive means through the field.

7. The method of detecting internal fissures in a rail which consists in moving a magnet adjacent the rail ball so as to create a trailing sustained magnetic field, of subjecting the rail ball in the trailing sustained field to a high frequency flux circuit, and of moving a flux-responsive means through the trailing sustained field immediately after the field has been subjected to the high frequency circuit.

8. In the method of rail fissure detection wherein a flux responsive means is passed through a trailing, weakening, electrically sustained flux field generated by a magnet moving in advance of the flux-responsive means, the step of subjecting the rail ball within the trailing sustained field to an alternating current magnet of a frequency of 800 to 1050 cycles immediately in advance of the moving flux responsive means.

9. The method of detecting fissures in rails which comprises the steps of moving a directional magnetizing force over the rail; of moving a magnetizing force of like strength but opposite polarity over the rail after a lapse of $x$ units of time; of moving a magnetizing force of the first polarity but double the strength over the rail after a lapse of $2x$ units of time, of then moving a magnet whose polarity is reversing 800 to 1050 times per second over the rail after a lapse of 1¼$x$ units of time, and of then immediately moving a flux responsive means through the field above the rail.

10. Apparatus for detecting fissures lying in rail track comprising two magnets longitudinally spaced by the distance $x$ adjacent the rail and operably connected to the car, a third magnet operably connected to the car adjacent the rail and spaced rearwardly of the second magnet by a distance $2x$, an alternating current magnet mounted on the car and spaced rearwardly of the third direct current magnet by approximately the distance 1½$x$, and a flux responsive means mounted on the car rearwardly of the alternating current magnet at a distance of 1/10 to ½$x$, the magnetic forces of the direct current magnets being such that the flux responsive means lies in a trailing sustained field.

11. Apparatus for detecting fissures lying in railroad track comprising a car movable along the rails, a first and a second direct current magnet of like strength spaced longitudinally along the rails by a distance $x$, a third magnet of double strength spaced longitudinally rearwardly of the second magnet by distance $2x$, and a flux responsive means spaced from the third magnet by approximately 1½$x$, the magnetic forces of the three magnets being such that the flux responsive means lies in a trailing sustained field.

12. Apparatus for detecting fissures lying in rail track comprising a car movable along the rails, three magnets mounted on the car and positioned adjacent the rail and longitudinally spaced from each other above one rail, the polarity of the first magnet being north, of the second magnet south, and of the third magnet north, an alternating current magnet positioned rearwardly of the third magnet adjacent the rail and mounted on the car, and a flux responsive means mounted on the car rearwardly of the alternating current magnet, said alternating current magnet and flux responsive means both being in the trailing sustained field of the third magnet.

References Cited in the file of this patent

UNITED STATES PATENTS

| | | |
|---|---|---|
| Re. 21,927 | Brace et al. | Oct. 21, 1941 |
| 2,218,784 | Billstein | Oct. 22, 1940 |
| 2,555,308 | Barnes | June 5, 1951 |